United States Patent [19]
Daniel et al.

[11] Patent Number: 5,860,058
[45] Date of Patent: Jan. 12, 1999

[54] METHOD AND APPARATUS FOR ROUTING SIGNALS THROUGH A COMMUNICATION SYSTEM HAVING MULTIPLE DESTINATION NODES

[75] Inventors: Brian Michael Daniel, Phoenix; Raymond Joseph Leopold, Tempe; Keith Andrew Olds, Mesa, all of Ariz.

[73] Assignee: Motorola, Inc., Schaumburg, Ill.

[21] Appl. No.: 703,425

[22] Filed: Aug. 26, 1996

[51] Int. Cl.⁶ .................................................. H04B 7/185
[52] U.S. Cl. ...................... 455/12.1; 455/13.1; 455/427; 455/428; 455/445
[58] Field of Search ................................. 455/12.1, 13.1, 455/427, 428, 445, 456

[56] References Cited

U.S. PATENT DOCUMENTS 4,789,980  12/1988  Darcie ...................................... 370/430

*Primary Examiner*—Howard Britton
*Attorney, Agent, or Firm*—Sherry J. Whitney; Jennifer B. Wuamett

[57] ABSTRACT

A method and apparatus for routing signals through a system (10) which has multiple destination nodes (12, 14) assigns one or more unique carrier frequencies to each destination node (12, 14). When a signal is received (502) by a transceiver (12), the transceiver (12) evaluates (504) the carrier frequency of the signal, and determines (506) to which destination node (12, 14) that carrier frequency is assigned. The determination (506) is made using a table (200) which associates carrier frequencies to destination nodes (12, 14). The table (200) is created (304) and updated by a control facility (20) which distributes (306) the table (200) to the transceivers (12). Once the transceiver (12) determines (506) the destination node (12, 14), the transceiver (12) can route the signal toward that destination node (12, 14).

20 Claims, 5 Drawing Sheets

| CARRIER FREQUENCY (204) | DESTINATION NODE (202) |
|---|---|
| 1,7,9 | 10 |
| 2 | 6 |
| 3,15 | 1 |
| • | • |
| • | • |
| • | • |
| N | 22 |

*200*

| CARRIER FREQUENCY | DESTINATION NODE |
|---|---|
| 1,7,9 | 10 |
| 2 | 6 |
| 3,15 | 1 |
| . | . |
| . | . |
| . | . |
| N | 22 |

METHOD AND APPARATUS FOR ROUTING SIGNALS THROUGH A COMMUNICATION SYSTEM HAVING MULTIPLE DESTINATION NODES

FIELD OF THE INVENTION

The present invention relates generally to wireless communications and, more particularly, to routing signals from multiple wireless communication units through a communication system having multiple destination transceiver nodes.

BACKGROUND OF THE INVENTION

A transceiver node (e.g., a satellite) of a wireless communication system is used to transmit information to communication units (e.g., mobile subscriber units), receive information from communication units, and route information to remote destination devices through other transceiver nodes. Where multiple communication units are serviced by a single transceiver node, traditional multiple access techniques isolate signals from each communication unit by providing each unit with a unique disjoint frequency or time slot. These techniques include Frequency Division Multiple Access (FDMA) and Time Division Multiple Access (TDMA), respectively. Multiple access can also be provided through sharing of a common spectrum, where allocation of disjoint frequency or time resources to each user is not attempted. Using the technique of spectrum sharing, or Code Division Multiple Access (CDMA), all bandwidth resources are allocated to all simultaneous users. Each user employs a noise-like wideband signal occupying the entire frequency allocation.

Common to all of the above multiple access techniques is the limitation that data packets within a multiple access signal must be isolated by intermediate transceiver nodes between a communication unit and a destination transceiver node (i.e., a node which ultimately delivers the signal to a destination device). The signals must be isolated so that routing information associated with each data packet can be evaluated and the packet can be routed to the destination node or another intermediate node accordingly.

The data packet isolation method depends on the type of multiple access technique employed. For example, in a system employing TDMA, each intermediate transceiver node must extract each data packet from the time slot to which it is assigned, evaluate the routing data, determine the destination transceiver node based on the data, repack the data packet into a signal, and then route the signal toward the destination node.

The evaluation and routing functions performed by the node, referred to herein as "onboard processing" increase proportionally with the number of active communication units supported by the node. Consequently, the service capacity of a node depends on the amount of hardware and software resources available to onboard processing tasks. Substantially higher capacities would likely result in higher costs and greater size and/or weight of the intermediate node.

What is needed is a method and apparatus to substantially reduce onboard processing performed by transceiver nodes. Further needed is a method and apparatus for rapidly routing data through a communication system. Further needed is a method and apparatus for rapidly routing data derived from multiple access signals.

DETAILED DESCRIPTION OF THE DRAWINGS

The method and apparatus of the present invention substantially reduces onboard processing performed by transceiver nodes. In addition, the method and apparatus of the present invention rapidly routes data through a communication system, particularly data derived from multiple access signals.

Basically, the method and apparatus of the present invention assigns a unique carrier frequency to each of multiple destination transceiver nodes which service destination devices. All communication units which send signals to destination devices serviced by a common transceiver node sends the signals using one or more common carrier frequencies. Within each common carrier frequency slot, the communication units are uniquely identified using an overlaid multiple access technique, such as TDMA or CDMA. Because communication units send signals using a carrier frequency of the destination transceiver node which services the intended destination device, intermediate transceiver nodes which must route the signals need only evaluate the carrier frequency of the signal to determine where to route the signal. The need for de-multiplexing or decorrelation of signals to determine routing information is eliminated.

The method and apparatus of the present invention enables the transceiver node to perform the routing function using very little onboard processing. This could result in less expensive and lighter transceiver node equipment because not as much processing equipment is necessary. Weight is an especially important consideration for systems which employ satellite transceiver nodes. Another advantage to the method and apparatus of the present invention is that, because signal isolation at intermediate nodes is not necessary, routing is quicker, thus reducing throughput delay through the system.

Figures 1, 2:
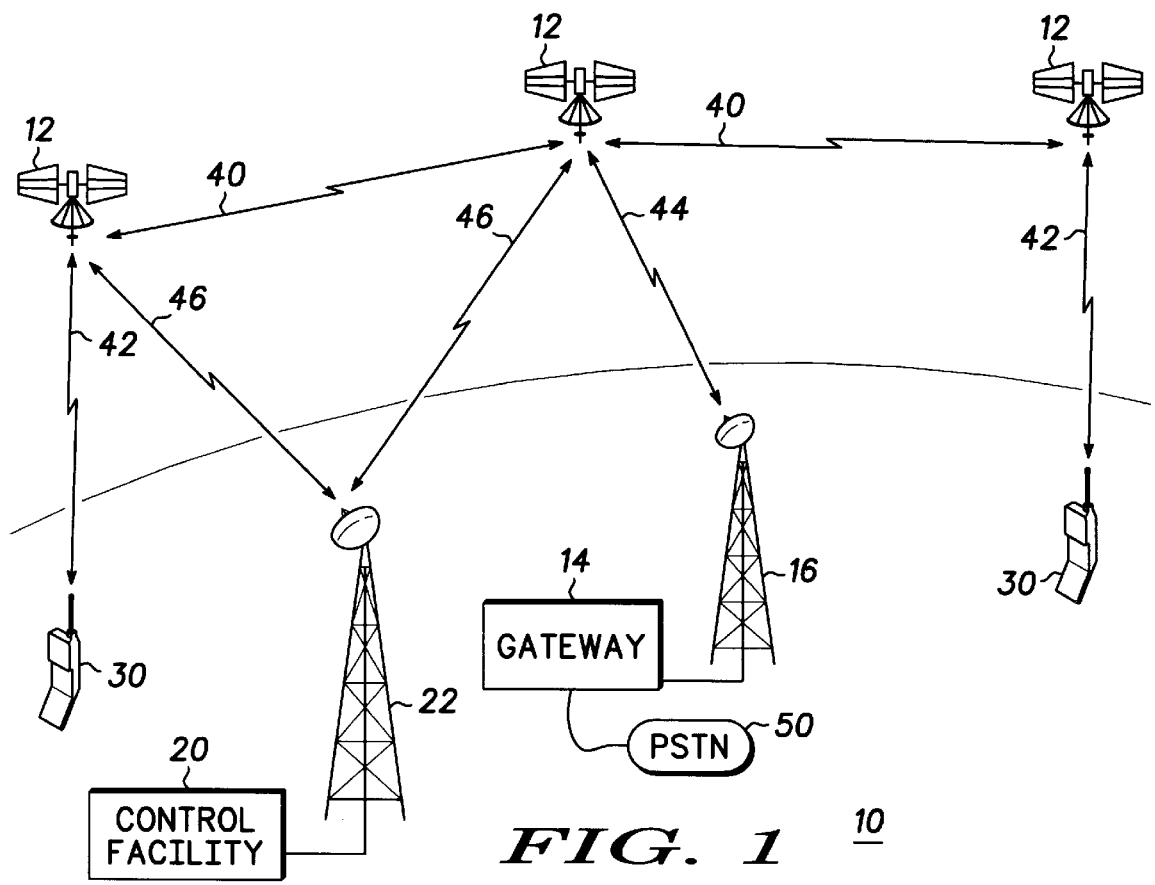
FIG. 1 illustrates a wireless communication system in accordance with a preferred embodiment of the present invention.
FIG. 2 illustrates a table which is used by a transceiver node to correlate a carrier frequency with a destination node in accordance with a preferred embodiment of the present invention.

FIG. 1 illustrates wireless communication system 10 in accordance with a preferred embodiment of the present invention. System 10 includes multiple transceiver nodes 12, gateway 14 (GW) with associated GW antenna 16, control facility 20 with associated control facility antenna 22, and at least one wireless communication unit 30 (CU).

Transceiver nodes 12 (or "nodes") are used to send and receive signals between CUs 30, GW 14, and control facility 20. Signals are communicated between nodes 12 over cross-links 40, between nodes 12 and CUs 30 over links 42, between nodes 12 and GW 14 over link 44, and between nodes 12 and control facility 20 over links 46.

Nodes 12 are shown to be satellites, although any type of wireless transceiver could be used. For example, nodes 12 could be low-earth, medium-earth, or geosynchronous satellites, lighter-than-air vehicles, airplanes, or any combination thereof.

As used herein, an "uplink node" is a node 12 which receives a signal directly from a CU 30, GW 14, or control facility 20. The device which sends a signal to a node is referred to herein as a "signal source". A "destination node" is a node 12 which services a destination device which ultimately should receive the signal. An "intermediate node" is a node 12 positioned between the uplink node and the destination node along the routing path of the signal. In some instances, no intermediate nodes will exist between the uplink node and the destination node. In fact, the uplink node and the destination node could be the same node when the signal source and the destination device are serviced by the same node.

An uplink node receives a signal from a signal source. The uplink node then determines a carrier frequency of the received signal. In accordance with a preferred embodiment of the present invention, the uplink node determines, from the carrier frequency, which node is a destination node for the signal. This determination can be made because each node which serves as a destination node is assigned a unique carrier frequency. Each uplink and intermediate node has knowledge of which carrier frequencies are assigned to which nodes and can, thus, determine a destination node by a signal's carrier frequency. Once the destination node is determined, the uplink node routes the signal toward the destination node either directly or through one or more intermediate nodes or ground links. Intermediate nodes perform in much the same manner as uplink nodes, except that the signals are received from another node, rather than from a signal source.

By having the ability to determine the destination node from the carrier frequency of the signal, the transceiver node does not need to isolate the signal and evaluate routing data as was done in prior-art methods. This results in significantly reduced processing time and equipment.

The destination node, which provides service to the destination devices, can be, for example, GW 14 which connects to a Public Switched Telephone Network 50 (PSTN), or another airborne, orbiting, or ground-based communication node. The destination node should receive all signals which use a carrier frequency which is assigned to the destination node, and isolate those signals for transmission to the destination devices. Thus, all signals using the same carrier frequency are routed to the same destination node. In accordance with a preferred embodiment of the present invention, a multiple access scheme is employed within each carrier frequency so that signals can be separated. For example, a TDMA or CDMA scheme could be used in conjunction with each carrier frequency to provide separation of the signals. Where CDMA is used, for example, the received signals would be decorrelated at the destination node and sent to the respective destination devices.

With an overlaid multiple access scheme in place, only a certain number of channels can be supported in conjunction with each carrier frequency. For example, a particular carrier frequency might be able to support a TDMA scheme where 100 time slots are available to different signal sources. Some destination nodes might be capable of simultaneously supporting many more than 100 destination devices at one time, and thus might benefit from having more than 100 signals routed to those destination nodes. In such cases, multiple carrier frequencies could be assigned to a particular destination node, thus increasing the ability of the routing strategy to route an appropriate number of channels toward the destination device.

The destination node can be relatively stationary or moving with respect to the surface of the earth. For those destination nodes which move significantly with respect to the surface of the earth, a call between a signal source and a destination device might need to be handed off from a first destination node to a second destination node one or more times during the course of the call. In accordance with a preferred embodiment of the present invention, this would require the signal source to modify the carrier frequency at which it is transmitting the signal to the carrier frequency assigned to the second destination node at the appropriate handoff time.

Other reasons for handing off to another destination node also exist. For example, a destination node could experience technical difficulties which preclude it from providing service to destination devices. Alternatively, the call-handling capacity of a destination node might be reached or exceeded, requiring the destination node to shunt some calls to a different node. Any occurrence which would require a first destination node to hand off to a second destination node could be handled by causing the signal source to modify its carrier frequency to the frequency assigned to the second destination node.

CU 30 could be, for example, a cellular telephone, radio, pager, data device or facsimile. CU 30 attempts to place a call to a destination device by sending a call request to the system. During call setup, CU 30 receives an assigned carrier frequency which CU 30 must use during at least a portion of the call. The assigned carrier frequency is determined by the system to correspond to the carrier frequency assigned to the destination node. CU 30 maintains a communication channel at the carrier frequency until instructed to do otherwise (e.g., when a hand off to a different destination node occurs).

A destination device could be, for example, another CU 30 or some other communication equipment (e.g., equipment which receives signals through GW 14). When the destination device is a CU 30, the destination node would be a transceiver which provides wireless service such as, for example, satellite 12 or a ground-based antenna. When the destination device is communication equipment which receives signals through, for example, GW 14, the destination node would be GW 14.

In a preferred embodiment, control facility 20 creates information which transceiver nodes 12 use to correlate carrier frequencies with destination nodes. Control facility 20 then sends the information, via control facility antenna 22, to transceiver nodes 12. Each transceiver node 12 can receive the information directly from control facility 20, or from another transceiver node 12 or ground link which relays the information to transceiver node 12.

In a preferred embodiment, control facility 20 initially creates a table which assigns one or more unique carrier frequencies to each of the multiple transceiver nodes 12, where each unique carrier frequency indicates a destination transceiver node of a signal from a CU. Control facility 20 then sends the table to transceiver nodes 12. In alternate embodiments, the information used to correlate frequencies with nodes can be determined by a different device or distributed devices.

FIG. 2 illustrates an exemplary table 200 which is used by a transceiver node to correlate a carrier frequency with a destination node in accordance with a preferred embodiment of the present invention. Table 200 has a column 202 which lists all destination transceiver nodes, and a column 204 with lists each carrier frequency which is assigned to that transceiver node. One or more carrier frequencies should be assigned to each destination node. As will be explained below, where a destination node will be handling a large number of channels, multiple carrier frequencies can be assigned to that destination node.

Occasionally, the changing configuration of system 10 could warrant one or more updates to the entire table or to specific entries of the table. Updates to the table or to specific entries would occur, for example, when one or more destination nodes move substantially with respect to the surface of the earth, when a destination node becomes completely or partially dysfunctional, or when call-handling capacity issues warrant changes to the assignment of destination nodes to destination devices.

When an update occurs, an entirely new table can be sent to transceiver nodes 12, or particular entries can be sent with instructions to modify the particular entries in the table. The table or entries can be sent to each node directly, or can be sent to one or more nodes which route the table or entries through system 10 to other nodes.

GW 14 (FIG. 1) is a facility which performs call setup functions for CUs 30. In addition, GW 14 can connect to PSTN 50 or another terrestrial based system, thus providing an interface between the wireless and wireline systems.

In call setup mode, GW 14 receives an indication from CU 30 that CU 30 wants to establish a communication path with a destination device. GW 14 determines destination nodes which are servicing the destination device and determines what carrier frequency has been assigned to one of those destination nodes. GW 14 then sends a value identifying the carrier frequency to CU 30 so that CU 30 can establish a channel with an uplink transceiver node at that carrier frequency.

Besides determining the carrier frequency, GW 14 also determines, in a preferred embodiment, the parameters which will enable signals from CU 30 to be integrated into a multiple access scheme and ultimately separated by the destination node. For example, where TDMA is used at a particular carrier frequency, GW 14 must determine which time slot will be allocated to CU 30. The time slot should not conflict with the time slot used by any other CU 30 which is communicating with the same destination node at the same carrier frequency.

In a preferred embodiment, GW 14 is also used, in those systems where the configuration of the transceiver nodes changes with time, to coordinate hand offs of a CU from a first destination node to a second destination node.

FIG. 1 illustrates only a few transceiver nodes 12, CUs 30, and a single GW 14 and control facility 20. In other configurations, more or fewer transceiver nodes 12, CUs 30, GWs 14, and control facilities 20 could be used. In addition, the functions performed by GW 14 and control facility 20 could be performed by a single facility. Alternatively, all or a subset of those functions could be shared by multiple facilities or transceiver nodes.

Figure 3:
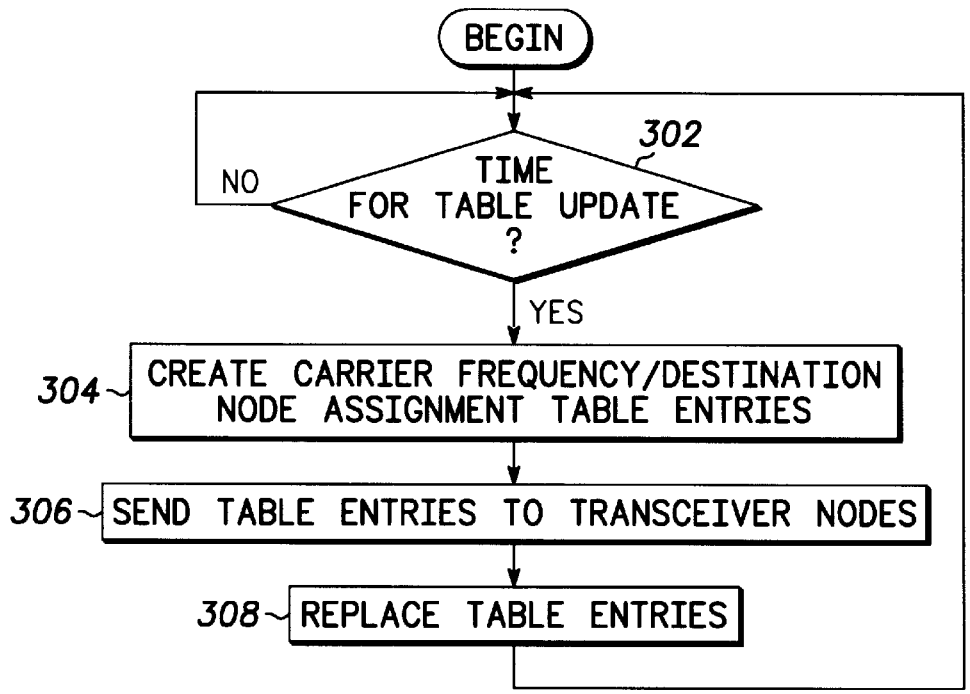
FIG. 3 illustrates a flowchart of a method for initializing or updating a routing table in accordance with a preferred embodiment of the present invention.

FIG. 3 illustrates a flowchart of a method for initializing or updating a routing table in accordance with a preferred embodiment of the present invention. In a preferred embodiment, the method could be performed by a control facility, a GW, or a transceiver node.

The method begins, in step 302, when a determination is made whether a time has arrived when a new table or an update to an existing table is necessary. Such a time could arrive upon initialization of the system or at any time when one or more destination nodes cannot provide service to a population of destination devices. An evaluation is made whether one or more of the destination nodes is incapable of providing service to particular destination devices. For example, a new or updated table could be necessary when the configuration of the system has changed significantly (e.g., when one or more of the transceiver nodes has moved), when a transceiver node is experiencing a planned or unplanned service outage, or the traffic-handling capacity of one or more nodes is or soon will be exceeded.

If a time for a new or updated table has not arrived, the procedure iterates as shown. If the time has arrived, then entries to a table assigning carrier frequencies to destination nodes are created in step 304. In this step, one or more unique carrier frequencies are assigned to each destination node. Optimally, creation of or update to a table requires a knowledge of the available spectrum, the expected traffic which could be supported by each destination node, and interference restrictions, among other things.

For example, in a system where N destination nodes exist, the spectrum allocated to the system could be divided into 2*N equal frequency slots. If each destination node expected the same amount of traffic, a fair assignment of frequency slots would mandate that each destination node was assigned two slots. However, a more likely case is that certain nodes will be expected to handle more traffic than others. Those nodes which will be expected to handle more traffic would be assigned more than two frequency slots, while those which will be expected to handle less traffic will be assigned two or less frequency slots.

After the table or entries are created, the table or entries are sent to each transceiver node in step 306. Each transceiver node then replaces its current table or updates particular entries in step 308 and the procedure iterates as shown. Instructions could accompany the new table or the table entries which indicate that the replacements be made at a particular time or times.

Figure 4:
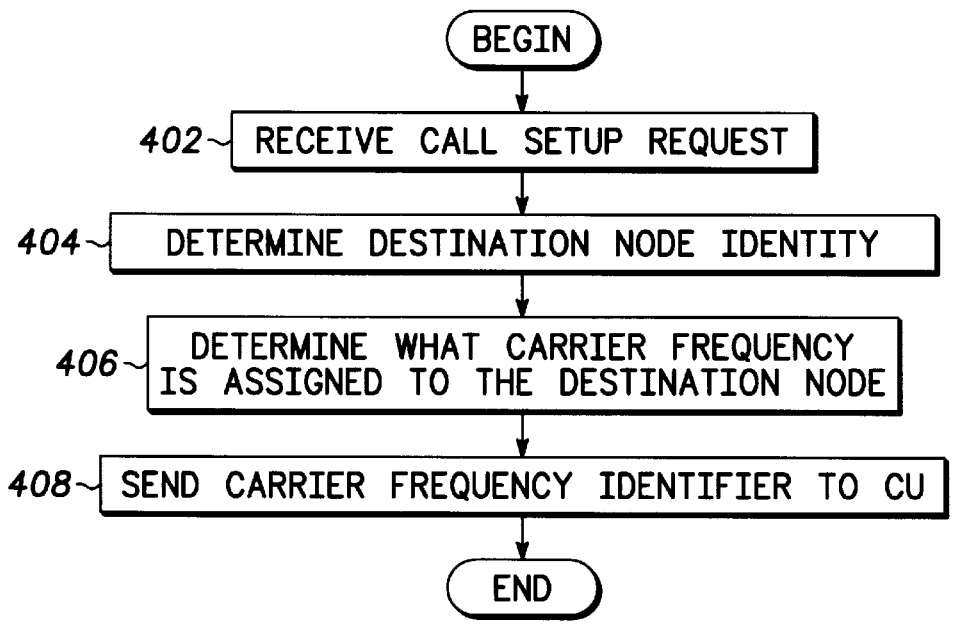
FIG. 4 illustrates a flowchart of a method for setting up a call in accordance with a preferred embodiment of the present invention.

FIG. 4 illustrates a flowchart of a method for setting up a call in accordance with a preferred embodiment of the present invention. In a preferred embodiment, the method is performed by a GW, although steps of the method also could be performed by a control facility or transceiver node. The method begins, in step 402, when a request to setup a call is received from a CU. A call setup request can indicate that the CU wishes to establish voice communications, send a facsimile or other data, or send a page, for example.

In step 404, the GW determines the identity of the destination node which is providing service to the destination device for which the communication is intended This determination requires the GW to have knowledge of the approximate location of the destination device and the destination transceiver node.

Next, in step 406, the GW determines what carrier frequency should be assigned to the CU for this communication. This evaluation can be made by consulting a table (e.g., table 200, FIG. 2) which shows which carrier frequencies are assigned to the particular destination node. Once the carrier frequency is determined, in a preferred embodiment, the GW must also determine to which multiple access slot the CU will be assigned. This requires knowledge of available multiple access slots and also knowledge of which slots are already being used or are reserved. Once the carrier frequency and multiple access slot are determined, values describing them are sent to the CU in step 408. The procedure then ends.

A GW could determine, after the call is established, that the communication should be handed off from a first destination node to a second destination node due to changes in the system. If so, the GW can determine a second carrier frequency of the second destination node and can send a value identifying the second carrier frequency to the CU so that it can begin sending the signal using the second carrier frequency.

Figure 5:
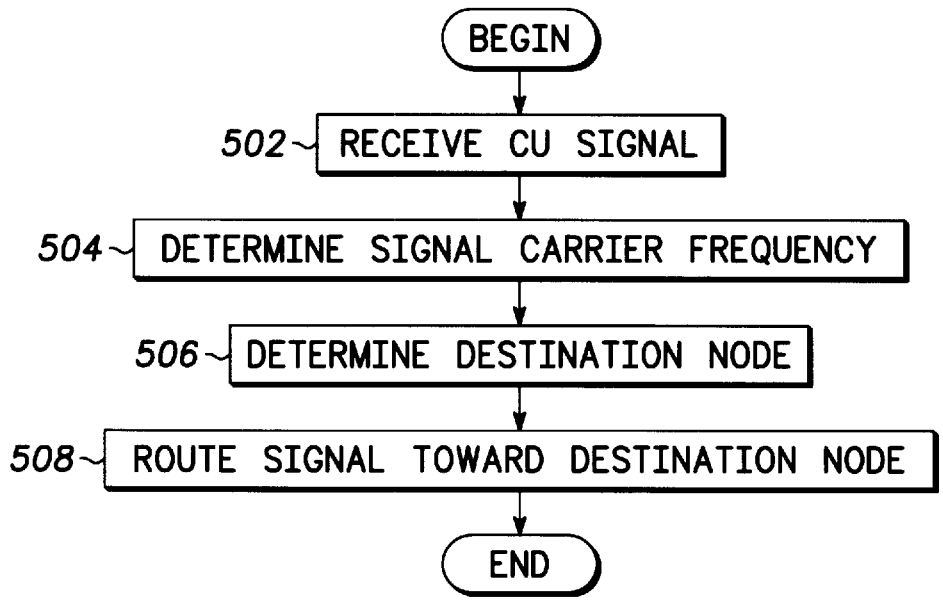
FIG. 5 illustrates a flowchart of a method for routing data in accordance with a preferred embodiment of the present invention.

FIG. 5 illustrates a flowchart of a method for routing data in accordance with a preferred embodiment of the present invention. In a preferred embodiment, the method is performed by an uplink or intermediate transceiver node. The method begins in step 502 when the node receives a signal. The node then determines, in step 504, the carrier frequency of the received signal. From the carrier frequency, the node determines, in step 506, the destination node for the signal. As explained previously, this determination can be made by comparing the carrier frequency to entries within a table (e.g., table 200, FIG. 2) which associates carrier frequencies with destination nodes.

Once the destination node is determined, the node routes the signal toward the destination node in step 508. When the destination node is within communication range of the node, the signal can be routed directly to the destination node. If not, the signal can be routed toward the destination node through one or more intermediate nodes or ground links. The procedure then ends.

Figure 6:
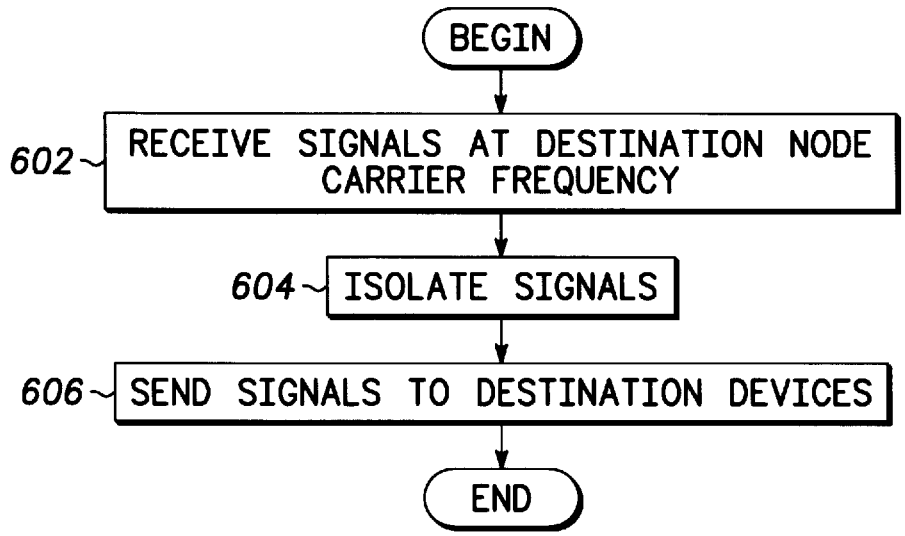
FIG. 6 illustrates a flowchart of a method for receipt and isolation of signals by a destination node in accordance with a preferred embodiment of the present invention.

FIG. 6 illustrates a flowchart of a method for receipt and isolation of signals by a destination node in accordance with a preferred embodiment of the present invention. The method begins, in step 602, when one or more signals are received by a destination node at a carrier frequency assigned to that destination node. In step 604, the destination node isolates each signal. Isolation of the signal depends on the type of multiple access scheme (e.g., TDMA or CDMA) used. After isolation of the signals, each signal is sent to the appropriate destination device in step 606 and the procedure ends.

Figure 7:
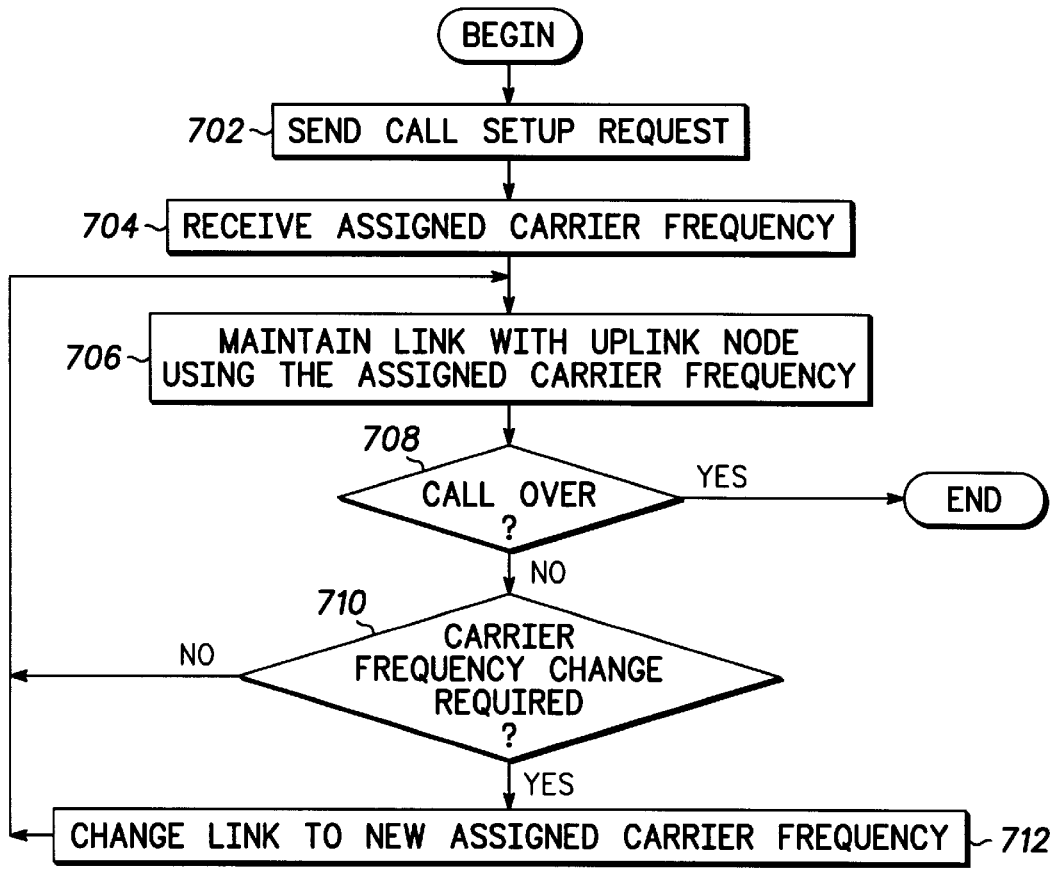
FIG. 7 illustrates a flowchart of a method for a communication unit to communicate using a particular carrier frequency in accordance with a preferred embodiment of the present invention.

FIG. 7 illustrates a flowchart of a method for a CU to communicate using a particular carrier frequency in accordance with a preferred embodiment of the present invention. The method begins, in step 702, when the CU attempts to place a call to a destination device by sending a call setup request to a GW. In step 704, the CU performs a call setup procedure and receives an assigned carrier frequency and multiple access slot at which it should communicate, where the assigned carrier frequency corresponds to an assigned frequency for the destination node.

In step 706, the CU maintains a link with the uplink node using the assigned carrier frequency and multiple access slot A determination is made, in step 708, whether the call has ended. If so, the procedure ends.

If not, then a determination is made, in step 710, whether a carrier frequency assignment change is required. For example, the CU could receive an indication that the destination node will not be providing service to the destination device and that a hand off is required to another destination node. As explained previously, a change in a carrier frequency could be warranted when the destination node is no longer capable of servicing the destination device. When no change in carrier frequency is required, the procedure repeats step 706 and iterates as shown. When a change in carrier frequency is required, the CU changes its link with the uplink node to the new carrier frequency and the procedure iterates as shown. Thus, a particular carrier frequency assignment could apply only to a portion of the call.

Figure 8:
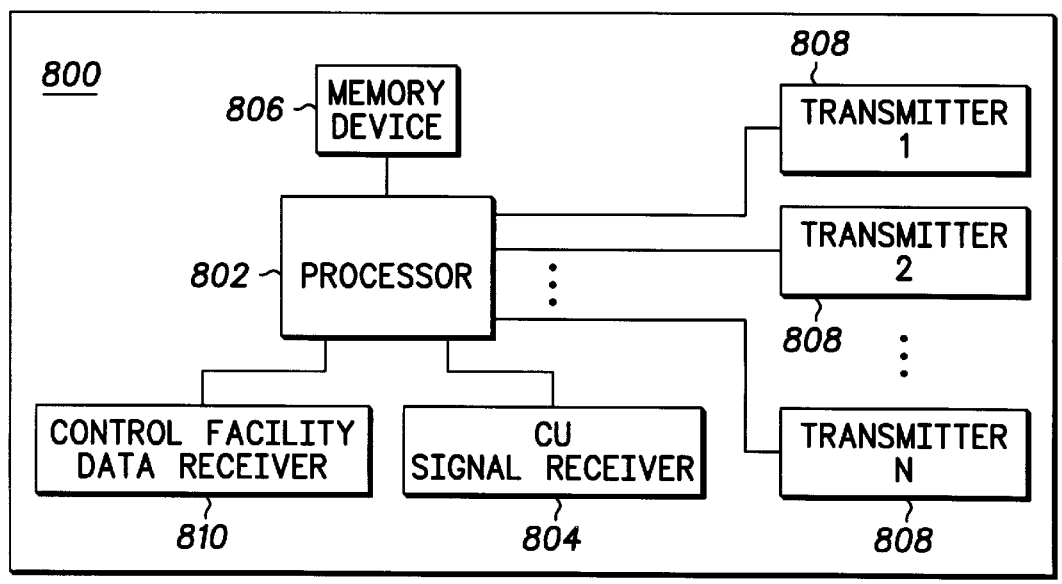
FIG. 8 illustrates a block diagram of a transceiver node in accordance with a preferred embodiment of the present invention.

FIG. 8 illustrates a block diagram of transceiver node 800 in accordance with a preferred embodiment of the present invention. In a preferred embodiment, transceiver node 800 includes processor 802, CU signal receiver 804, memory device 806, and at least one transmitter 808. When transceiver node 800 receives carrier frequency tables directly from a control facility, node 800 also includes control facility data receiver 810.

CU signal receiver 804 receives signals from CUs. Processor 802 then determines, based on the carrier frequency of each signal, which destination node corresponds to the particular carrier frequency. In a preferred embodiment, this determination is made using a table which correlates carrier frequencies to destination nodes. The table is stored in memory device 806. One or more transmitters 808 are used to send the signal toward the appropriate destination node. Transmitters 808 can have links with other airborne or orbiting transceivers or with ground based equipment.

In a preferred embodiment, control facility data receiver 810 receives the table, table entries, or other information which enables node 800 to correlate the carrier frequencies with the destination nodes. This information can be received from a control facility, GW, or other node.

Figure 9:
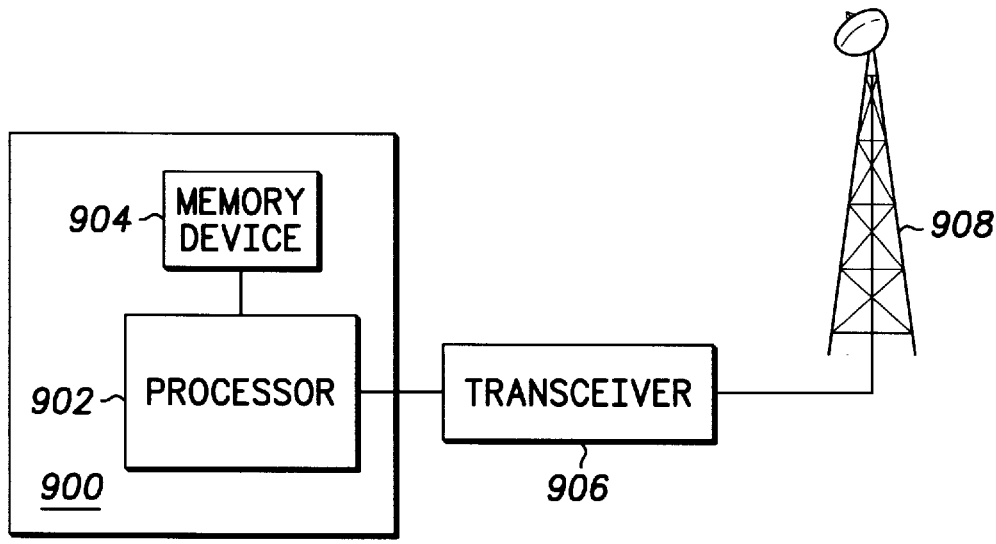
FIG. 9 illustrates a block diagram of a gateway or control facility in accordance with a preferred embodiment of the present invention.

FIG. 9 illustrates a block diagram of a GW or control facility 900 in accordance with a preferred embodiment of the present invention. Facility 900 includes processor 902, memory device 904, and transceiver 906 connected to antenna 908.

When facility 900 is operated as a GW, transceiver 906 receives an indication that a CU wishes to place a call to a destination device. Processor 902 then determines a destination node which provides service to the destination device, and determines a carrier frequency which has been assigned to that destination node. Processor 902 then sends, via transceiver 906 and antenna 908, a value identifying the carrier frequency to the CU.

When facility 900 is operated as a control facility, processor 902 creates a table which assigns one or more unique carrier frequencies to each of the multiple destination nodes. Transceiver 906 operates as a transmitter, which sends entries of the table to the transceiver nodes, so that when a first transceiver node receives a signal from a CU at a particular carrier frequency, the first transceiver node can determine, by comparing the particular carrier frequency to the entries of the table, which node is the destination node of the signal.

Figure 10:
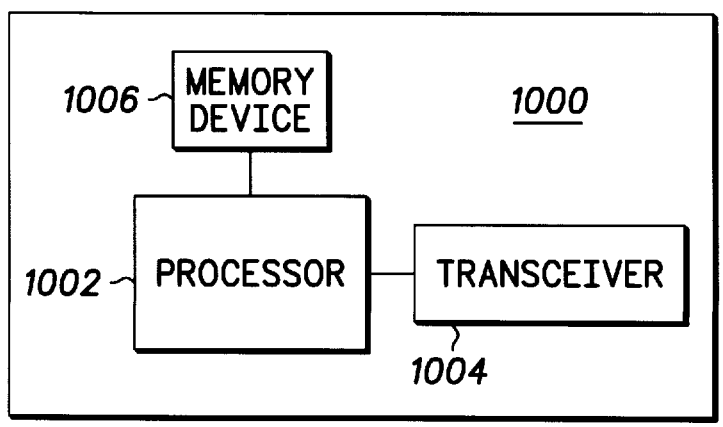
FIG. 10 illustrates a block diagram of a communication unit in accordance with a preferred embodiment of the present invention.

FIG. 10 illustrates a block diagram of CU 1000 in accordance with a preferred embodiment of the present invention. In a preferred embodiment, CU 1000 includes processor 1002 and transceiver 1004. CU 1000 also could include memory device 1006 which could be used to store information regarding carrier frequencies and multiple access slot information.

Processor 1002 initiates an attempt to place a call to a destination device and receives, as a result of attempting to place the call, an identification of an assigned carrier frequency which CU 1000 should use during at least a portion of the call. The assigned carrier frequency represents a frequency assigned to a destination node which provides communication service to the destination device. Processor 1002 also maintains a communication channel defined by the assigned carrier frequency during the portion of the call. Transceiver 1004 sends the call attempt, receives the assigned carrier frequency, and transmits a signal using the assigned carrier frequency.

In summary, a method and apparatus has been described which assigns unique carrier frequencies to destination nodes in order to simplify routing of signals destined for devices serviced by each destination node. The method and apparatus of the present invention has numerous advantages over the prior art and solves problems not addressed in prior art systems.

The present invention has been described above with reference to preferred embodiments. However, those skilled in the art will recognize that changes and modifications may be made in these preferred embodiments without departing from the scope of the present invention. For example, the processes and stages identified herein may be categorized and organized differently than described herein while achieving equivalent results. These and other changes and modifications which are obvious to those skilled in the art are intended to be included within the scope of the present invention.

What is claimed is:

1. A method for routing a signal originating from a wireless communication unit and destined for a destination device through a system comprising multiple transceiver nodes, the method performed by a transceiver node comprising the steps of:
   a) receiving the signal from the wireless communication unit wherein the signal was transmitted by the wireless communication unit at a carrier frequency;
   b) determining the carrier frequency of the signal;
   c) determining, based on the carrier frequency, the identity of a destination transceiver node which corresponds to the carrier frequency, wherein the destination transceiver node provides service to the destination device; and
   d) routing the signal toward the destination transceiver node, the identity of which was determined in the determining step.

2. The method as claimed in claim 1, further comprising the steps of:
   e) determining that the destination transceiver node which corresponds to the destination device will no longer provide the service to the destination device;
   f) determining a second carrier frequency which corresponds to a second destination transceiver node which will service the destination device; and
   g) handing off the signal by routing the signal toward the second destination transceiver node.

3. The method as claimed in claim 2, wherein the destination transceiver node moves relative to a surface of an earth and step e) comprises the step of:
   e1) determining whether the destination transceiver node has moved to a location where the destination transceiver node is incapable of maintaining communications with the destination device.

4. The method as claimed in claim 2, wherein the destination device moves relative to a surface of an earth and step e) comprises the step of:
   e1) determining whether the destination device has moved to a location where the destination transceiver node is incapable of maintaining communications with the destination device.

5. The method as claimed in claim 1, wherein step c) comprises the steps of:
   c1) comparing the carrier frequency with a table indexing carrier frequencies with destination transceiver nodes; and
   c2) determining the destination transceiver node as a node in the table which corresponds to the carrier frequency.

6. The method as claimed in claim 5, further comprising the steps of:
   e) receiving new entries to the table from a control facility; and
   f) modifying the table by replacing current entries with the new entries.

7. A method for a wireless communication unit to communicate with a destination device through a system comprising multiple transceiver nodes, the method performed by the wireless communication unit comprising the steps of:
   a) initiating a call setup procedure by attempting to place a call to the destination device;
   b) receiving, during the call setup procedure, information identifying a carrier frequency for use by the wireless communication unit, wherein the carrier frequency represents a frequency assigned to a destination transceiver node which provides communication service to the destination device, and wherein no other destination transceiver node is assigned the carrier frequency; and
   c) maintaining a communication channel at the carrier frequency during at least a portion of the call so that the system can route information to the destination transceiver node to which the carrier frequency is assigned.

8. The method as claimed in claim 7, further comprising the steps of:
   d) receiving an indication that the destination transceiver node will not be providing the communication service to the destination device; and
   e) handing off to a second carrier frequency which is assigned to a second destination transceiver node which provides the communication service to the destination device.

9. A method for a wireless communication unit to communicate with a destination device through a system comprising multiple transceiver nodes, the method performed by the wireless communication unit comprising the step of maintaining a communication channel with the destination device through a path comprising a first transceiver node which communicates with the wireless communication unit and a destination transceiver node which provides service to the destination device, wherein the wireless communication unit maintains the communication channel by sending signals destined for the destination node using a particular carrier frequency, wherein the particular carrier frequency is a frequency that has been assigned only to the destination transceiver node and the first transceiver node knows to route the signals to the destination transceiver node because of the frequency of the particular carrier frequency of the signals which are sent by the wireless communication unit.

10. The method as claimed in claim 9, further comprising the step of receiving an indication that the destination transceiver node will no longer be providing the service to the destination device and, the wireless communication unit handing off to a second communication channel by sending the signals using a second carrier frequency which has been assigned to a second destination transceiver node, wherein the second destination transceiver node will be providing the service to the destination device.

11. A method for a switching facility to provide communications between a wireless communication unit and a destination device through a system comprising multiple transceiver nodes, the method performed by the switching facility comprising the steps of:
   a) receiving an indication that the wireless communication unit wishes to place a call to the destination device;
   b) determining, based on the indication, a destination transceiver node which provides service to the destination device;
   c) determining a carrier frequency which has been assigned to the destination transceiver node;
   d) sending a value identifying the carrier frequency to the wireless communication unit; and
   e) maintaining the call by the wireless communication unit sending signals at the carrier frequency during at least a portion of the call, wherein the switching facility receives the signals at the carrier frequency and sends them to the destination transceiver node which has been assigned the carrier frequency.

12. The method as claimed in claim 11, further comprising the steps of:
   d) sending an indication to the wireless communication unit that the destination transceiver node will not be providing the service to the destination device;
   e) determining a second destination transceiver node which will be capable of providing the service; and
   f) sending a second value identifying a second carrier frequency which is assigned to the second destination transceiver node.

13. A method for controlling signal routing through a wireless communication system comprising multiple transceiver nodes which provide communication service to wireless communication units, the method performed by a control facility comprising the steps of:
   a) creating a table which assigns at least one unique carrier frequency to each of the multiple transceiver nodes, wherein each of the at least one unique carrier frequency indicates a destination transceiver node of a signal; and
   b) sending entries of the table to the multiple transceiver nodes, so that when a first transceiver node receives the signal from a communication unit at a particular carrier frequency, the first transceiver node can determine, by comparing the particular carrier frequency to the entries of the table, which of the multiple transceiver nodes is the destination transceiver node of the signal and the first transceiver node can route signals received at the particular carrier frequency to the destination transceiver node to which the particular carrier frequency is assigned.

14. The method as claimed in claim 13, further comprising the steps of:
   c) evaluating whether one or more of the multiple transceiver nodes has moved with respect to one or more destination devices so that re-assigning the at least one unique carrier frequency is necessary;
   d) when re-assigning the at least one unique carrier frequency is necessary, creating new table entries for the multiple transceiver nodes which have been re-assigned; and
   e) sending the new table entries to the multiple transceiver nodes so that the multiple transceiver nodes can update the table.

15. A transceiver node for use in a wireless communication system comprising multiple transceiver nodes which route a signal from a wireless communication unit to a destination device through at least one of the multiple transceiver nodes, the transceiver node comprising:
   a communication unit signal receiver for receiving the signal from the wireless communication unit, wherein the signal is received on a channel which is defined by a particular carrier frequency;
   a processor, coupled to the communication unit signal receiver, for determining, based on the particular carrier frequency, which of the multiple transceiver nodes is a destination transceiver node corresponding to the particular carrier frequency, wherein the destination transceiver node is a transceiver node which provides service to the destination device;
   a memory device, coupled to the processor, for storing information which correlates carrier frequencies with the multiple transceiver nodes, wherein the information is used by the processor to determine the destination transceiver node; and
   at least one transmitter, coupled to the processor, for sending the signal toward the destination transceiver node.

16. The transceiver node as claimed in claim 15, further comprising:
   a receiver, coupled to the processor, for receiving the information which correlates the carrier frequencies with the multiple transceiver nodes, wherein the information is received from a control facility.

17. The transceiver node as claimed in claim 15, wherein the destination transceiver node can become incapable of communicating with the destination device and the processor is further for sending the signal toward a second destination transceiver node which is capable of communicating with the destination device.

18. A wireless communication unit for use in a communication system comprising multiple transceiver nodes which route a signal from the wireless communication unit to a destination device, the wireless communication unit comprising:
   a processor for attempting to place a call to the destination device, for receiving, as a result of attempting to place the call, an identification of an assigned carrier frequency which the wireless communication unit must use during at least a portion of the call, wherein the assigned carrier frequency represents a frequency assigned to a destination transceiver node which provides communication service to the destination device, the processor further for maintaining a communication channel defined by the assigned carrier frequency during the portion of the call; and
   a transceiver, coupled to the processor, for transmitting the signal using the assigned carrier frequency.

19. A gateway for use in a communication system comprising multiple transceiver nodes which route a signal from a wireless communication unit to a destination device, the gateway comprising:
   a transceiver for receiving an indication that the wireless communication unit wishes to place a call to the destination device; and
   a processor, coupled to the transceiver, for determining a destination transceiver node which provides service to the destination device, for determining a carrier frequency which has been assigned to the destination transceiver node, for sending a value identifying the carrier frequency to the wireless communication unit through the transceiver, and for maintaining the call at the carrier frequency during at least a portion of the call.

20. A control facility for use in a communication system comprising multiple transceiver nodes which route a signal from a wireless communication unit to a destination device, the control facility comprising:

a processor for creating a table which assigns at least one unique carrier frequency to each of the multiple transceiver nodes, wherein each of the at least one unique carrier frequency indicates a destination transceiver node of the signal; and a transmitter, coupled to the processor, for sending entries of the table to the multiple transceiver nodes, so that when a first transceiver node receives the signal from the wireless communication unit at a particular carrier frequency, the first transceiver node can determine, by comparing the particular carrier frequency to the entries of the table, which of the multiple transceiver nodes is the destination transceiver node of the signal.

* * * * *